United States Patent [19]

Ender et al.

[11] Patent Number: 5,697,230
[45] Date of Patent: Dec. 16, 1997

[54] DEVICE FOR CLEANING DIRTY OBJECTS, FOR EXAMPLE DIRTY TEXTILES OR DISHES, CHARGING DEVICE HEREFOR, AND COMBINATION OF THESE

[75] Inventors: Manfred Ender, Kapf; Dieter Meyer, Bad Nenndorf; Brigitte Meyer, Bad Nenndorf; Gerhard Schneider, Bad Nenndorf; Siegfried Schröder, Bad Nenndorf, all of Germany

[73] Assignee: Wash-Ball AG, Schaam, Liechtenstein

[21] Appl. No.: 372,033

[22] Filed: Jan. 12, 1995

[30] Foreign Application Priority Data

Apr. 7, 1994 [DE] Germany ............ 44 12 013.3
Jul. 22, 1994 [DE] Germany ............ 44 26 084.9
Aug. 4, 1994 [DE] Germany ............ 44 27 658.3

[51] Int. Cl.⁶ .................................................. B08B 3/10
[52] U.S. Cl. ................ 68/3 SS; 68/3 SS; 366/128; 366/127
[58] Field of Search ........................ 366/128, 129, 366/127; 68/3 SS; 134/184, 185, 186, 1; 601/70, 73, 154; 446/437, 458

[56] References Cited

U.S. PATENT DOCUMENTS

| | | | |
|---|---|---|---|
| 2,520,833 | 8/1950 | Connolly et al. | 366/128 |
| 2,622,425 | 12/1952 | Harshberger | 68/3 SS |
| 2,650,872 | 9/1953 | Goldwasser | 68/3 SS |
| 3,453,773 | 7/1969 | Compton et al. | 446/458 |
| 3,466,017 | 9/1969 | Malvin | 68/3 SS |
| 3,500,579 | 3/1970 | Bryer | 446/437 |
| 3,779,238 | 12/1973 | Cutler et al. | 601/73 |
| 3,985,344 | 10/1976 | McCord | 366/127 |
| 4,193,842 | 3/1980 | Rushing | 68/3 SS |
| 4,225,952 | 9/1980 | Lewis . | |
| 4,246,792 | 1/1981 | Matzuk . | |
| 5,176,130 | 1/1993 | Kim | 601/73 |
| 5,413,551 | 5/1995 | Wu | 601/70 |

FOREIGN PATENT DOCUMENTS

| | | | |
|---|---|---|---|
| 212099 | 11/1957 | Australia | 68/3 SS |
| 80201393 | 4/1984 | China . | |
| 1011575 | 6/1952 | France | 68/3 SS |
| 1077541 | 5/1954 | France | 68/3 SS |
| 1102562 | 10/1955 | France . | |
| 958865 | 2/1957 | Germany | 601/70 |
| 9002289 | 6/1990 | Germany . | |
| 9316089 | 4/1994 | Germany . | |
| 609776 | 10/1960 | Italy | 68/3 SS |
| 54-113964 | 9/1979 | Japan | 134/184 |
| 701476 | 12/1953 | United Kingdom | 68/3 SS |
| 0710713 | 6/1954 | United Kingdom . | |
| 769191 | 2/1957 | United Kingdom | 68/3 SS |

*Primary Examiner*—Frankie L. Stinson
*Attorney, Agent, or Firm*—Birch, Stewart, Kolasch & Birch, LLP

[57] ABSTRACT

A device for cleaning dirty objects, for example dirty textiles or dishes, is characterized by a fluid-proof housing (8) immersible in water together with the dirty objects and made to vibrate by means of a drive mechanisms (12; 46). The vibrations may be generated by means of an unbalance weight (26) driven by an electromotor (12), the electromotor (12) and the unbalance weight (26) being arranged inside said housing (8). A charging device for the device (2) comprises a housing (98), with a column-shaped extension being formed on the housing, the outer section of which matches essentially without a gap with the inner section of a receiving chamber of the housing (8) of the device, and an inductive transmitter coil being furthermore arranged inside said extension.

35 Claims, 5 Drawing Sheets

DEVICE FOR CLEANING DIRTY OBJECTS, FOR EXAMPLE DIRTY TEXTILES OR DISHES, CHARGING DEVICE HEREFOR, AND COMBINATION OF THESE

The invention concerns a device for cleaning dirty objects, for example dirty textiles or dishes, a charging device herefor, and a combination of these.

In the course of the laundering or dishwashing work—or cleaning processes in general—arising in the household on a daily basis, expenses for energy, water and detergents in partly quite considerable amounts must be met.

The present invention has therefore made it its object to provide a device for cleaning dirty objects, for example dirty textiles or dishes, which makes it possible to have the cleaning process take place without any manual intervention from outside, as it were in analogy with the cleaning processes unfolding inside a machine, and where it is possible to at least largely eliminate the sometimes voluminous and/or combined use of detergents or auxiliary agents.

According to the invention, this object is attained by means of the device of claim 1. A preferred charging device is indicated in claim 22, and a combination of device and charging device herefor in claim 23.

The manipulations still required for cleaning dirty objects, for example dirty textiles or dishes, are thus restricted to filling a suitable container, for example a bucket or a sink, with water having the desired temperature, placing the dirty objects, e.g. dirty textiles or dishes, in the water bath, and placing the device according to the invention in the water with the objects. The vibrations produced by the drive mechanism propagate in all directions in the water and impact on the dirt particles such as to disengage them from the surfaces to which they are clinging.

The cleaning effect attainable with the device according to the invention may, in a given case, be supported by a suitable cleaning agent, e.g. a detergent or the like.

Advantageous developments of the invention form the subject matters of the subclaims.

The vibrations are preferably generated by means of an unbalance weight driven by an electromotor, said electromotor and unbalance weight being positioned inside the housing. This means that the housing of the device according to the invention contains the vibration or oscillation generator together with the associated drive mechanism, such that the device according to the invention is a compact apparatus which is essentially closed to the outside and easy to transport.

The vibrations are in a range of approximately 30–150 Hz, more precisely in the range of approximately 40–100 Hz, and in particular at approximately 50 Hz. Vibrations of less than approximately 30 Hz produce only a extremely weak cleaning effect or no cleaning effect at all, whereas oscillations or vibrations in excess of 150 Hz may already tend to attack particularly sensitive materials, e.g. synthetic fibers or silk in the case of textile fabrics, and thin glasses or dishes with a gold rim or the like in the case of dishes, as is also known of ultrasound.

The housing is essentially sphere-shaped. Even though differently shaped embodiments of the housing are equally possible, the spherical shape may be assumed to be preferred as, due to the absence of protrusions, edges etc. damage or injury to the objects to be cleaned and here in particular to textile materials need not be feared.

The spherical surface is preferably provided with a plurality of rib-like projections. The vibrations of the spherical housing produced by the drive mechanism are coupled more intensely to the surrounding water or the surrounding cleaning or washing fluid thanks to these rib-like projections because of an increased surface.

When the rib-like projections are curved in a general S-shape and arranged at an equal pitch from the lower to the upper pole of the sphere-shaped housing, the result is not only a further homogenisation of the radiating characteristics but also an optically particularly interesting and also attractive exterior of the device according to the invention.

Inside the housing, a magnet is preferably arranged which is independent of the electromotor magnets, and which moreover preferably is a permanent ring magnet. It is known that magnets exert an effect on water whereby calcium contained therein will not, or only to a lesser degree, deposit on pipes, vessels, fibers, or the like. On account of the at least one permanent magnet, the water surrounding the housing therefore is influenced to the effect of the water becoming "softer", resulting in particularly good cleaning or laundering effects in combination with the vibrations or oscillations. In a case where this combination of vibration and magnetism is furthermore complemented by enrichment with oxygen, for example by means of oxygen tablets introduced into the cleaning fluid or the like, it will under certain circumstances be possible to altogether cut the use of detergents and cleaning agents.

If the permanent ring magnet is arranged in the area of the equatorial plane of the spherical housing, the maximum inner diameter of the housing is available for housing it.

The magnet may therefore be designed to be correspondingly large and powerful. Furthermore, the housing is self-aligning in the cleaning fluid or water due to this arrangement of the magnet. Finally, the upper end region of the electromotor may thus be held by the central opening of the magnet in the manner of a bearing, and additional means for this purpose may be done away with.

The drive mechanism for the unbalance weight in addition preferably drives a pump element. By means of this pump element, the water containing the device according to the invention may, in a given case, be kept in motion or agitated, such that the removal of dirt particles loosened by the vibrations will be further improved.

The vibrating drive mechanism is in another preferred embodiment an oscillating armature motor arranged together with the associated energy supply and control means in the housing which is closed watertight but can be opened. Oscillating armature motors comprise less wear parts than normal electromotors having a rotor and a stator, and thus have a long service life. Vibrating motions of the housing which are favorable for the cleaning process may, under certain circumstances, furthermore also be generated by the oscillating armature motor, as the pendulum-type armature in operation may pass on certain vibrations to the housing surrounding it. In addition, oscillating armature motors easily withstand the temperatures of 95° C. and more prevailing at conditions of laundering by boiling, as opposed to normal electromotors.

In a particularly preferred manner, the combination is furthermore such that by means of the oscillating armature motor not only the vibrations of the housing are generated, but the oscillating armature motor furthermore drives a diaphragm pump. By means of this diaphragm pump a certain liquid flow may be created in the wash fluid, whereby the cleaning effect may in a given case be further intensified.

In addition to the rippling of the water surface and concurrent introduction of oxygen into the water due to the oscillations or vibrations, the diaphragm pump causes a movement or mixing of deeper water layers, as well, thus favoring the introduction of oxygen taking place at the water surface into deeper layers of the water, as well.

If, then, a porous element in the manner of discharging rock, as is for example used in tanks for keeping fish for finely bubbling air through it into the water, is arranged in the outlet opening of he diaphragm pump, the introduction of minute air bubbles into the water occurs at each pumping cycle of the diaphragm pump.

The energy supply for generating oscillations or vibrations is preferably achieved by a plurality of accumulators.

In accordance with another preferred, optional embodiment of the present invention, charging the accumulators is done free of contact by means of an induction coil. This induction coil is located inside the housing, wound around a receiving chamber which extends into the interior of the housing, and connected to the accumulators via corresponding electronical control and regulation means. In order to charge the accumulators, the housing is combined with a corresponding inductive transmitter, and the energy emitted by the transmitter is received through the housing wall by the induction coal and transformed into a charging voltage or a charging current, respectively, for the accumulators. The housing therefore need not be opened in order to re-charge exhausted accumulators. Accordingly, the housing may, under certain circumstances, also be formed to be entirely closed, i.e. glued together, injection-molded or the like to be watertight, whereby any entry of water into the housing is safely prevented.

The inductive transmitter is located inside a charging device formed by a housing provided with a base surface, with a column-shaped extension formed at a surface of the housing which faces away from the base surface, the outer section of which matches with the inner section of the receiving chamber of the housing of the device essentially without a gap, with an inductive transmitter coil furthermore being arranged inside the extension. By simply sliding the housing of the device on the charging device, with the extension coming to be lodged in the receiving chamber, the inductive transmitter of the charging device and the inductive receiver coil in the device get into close vicinity, and re-charging the accumulators may be carried out. This combination furthermore represents the inactive condition of the device according to the invention. The spherical housing is held securely and also in an optically attractive manner on the extension of the charging device housing, and due to the permanent re-charging activity, the device is operable at any time.

According to another preferred embodiment, switching on the energy supply is carried out free of contact by immersing the housing in the washing liquid. This is achieved e.g. by two neighboring contact electrodes being located in close vicinity of each other on the outer surface of the housing which is exposed to the washing liquid, with these electrodes applying the load current to the consumer(s) via an amplifying circuit connected in series whenever an identical potential is provided between them on account of the surrounding washing liquid. It is therefore not necessary to provide a manually operable switch inside the housing.

Inside the housing, a chamber for a cleaning agent such as a detergent, a stain remover, a rinsing agent, a fragrant substance, an oxygen carrier in the form of granules or the like may furthermore be formed.

Finally, a memory chip, in particular in the form of a ROM (read only memory) for a washing program may be arranged in the housing.

Further details, aspects and advantages of the present invention result from the following description of embodiments by referring to the drawing, wherein.

Figure 1:
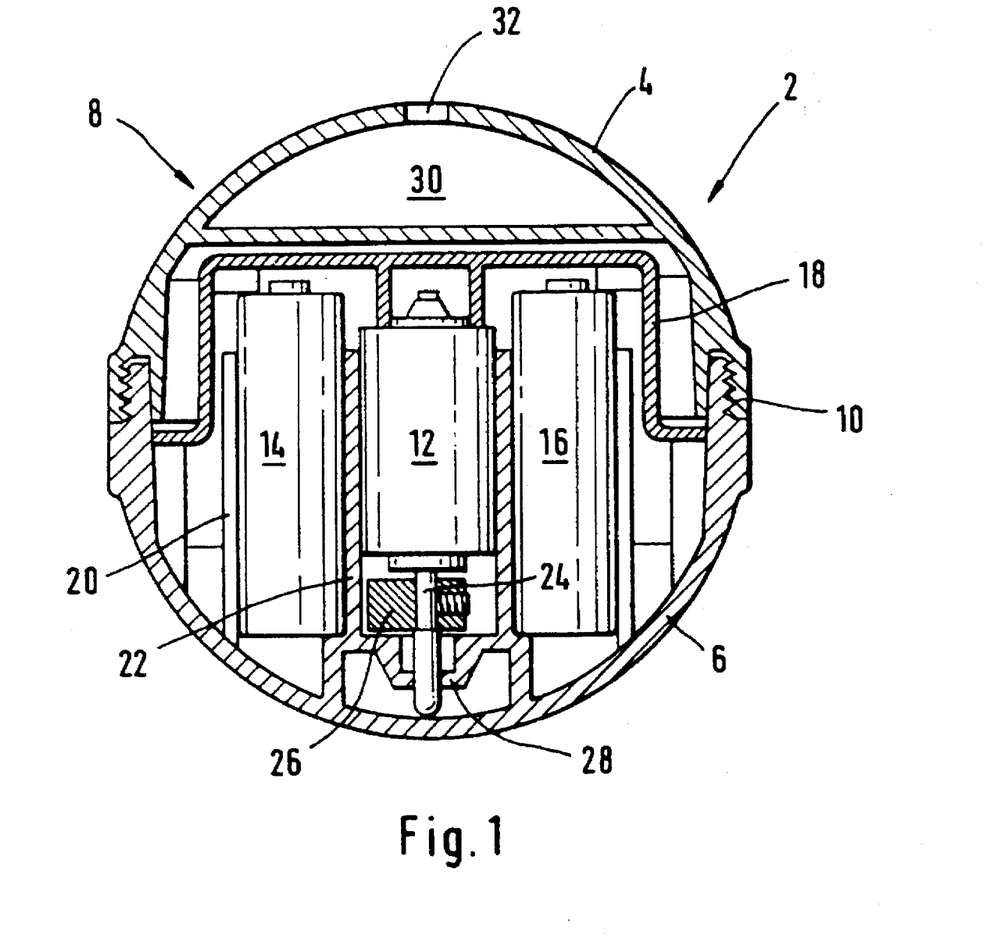
FIG. 1 shows a sectional view of an embodiment of a device according to the invention.

A device according to the invention generally shown in the drawing under 2 for cleaning dirty objects, for example textiles or dashes, according to FIG. 1 comprises a housing 8 formed by an upper shell 4 and a lower shell 6, with the two shells 4 and 6 being connected to each other in the area of the equatorial plane by means of a watertight screw connection 10 or any other watertight connection which is capable of being released in a given case. Inside the inner space of the housing 8 defined by the shells 4 and 6, apart from an electromotor 12 a number of energy supply units, for example two batteries or accumulators 14 and 16 are provided, whereby the electromotor 12 is supplied with electrical energy. Positional fixation of electromotor 12, energy supply units 14 and 16 and other associated components is achieved by supporting webs and ribs present in the lower shell 6, some of which are designated by reference numerals 18 to 22.

When the upper shell 4 has been removed from the lower shell 6, the inner space of the housing 8 is accessible whenever necessary, for example in order to replace exhausted batteries with fresh ones, or in order to remove re-chargeable accumulators if these are used instead of the batteries, or to re-charge them in situ via a charging socket provided on the side of the housing. When the upper shell 4 has been removed, an electrical switch may furthermore be actuated in order to switch the electromotor 12 on and off.

Instead of a switch present inside the housing 8 for switching the electromotor 12 on and off, a switch controlled by a potential and having the form of two contact surfaces arranged at a distance from each other may be provided on the outside of the housing 8, for example on the outer circumference wall of the lower shell 6, with a contact between the two contact surfaces being established by the more or less conductive washing water upon submersion of the device 2 according to the invention into the washing water, and the electromotor 12 starting to operate automatically, as it were. When the housing 8 of the device 2 is subsequently removed from the washing water, the electromotor 12 automatically switches off. This embodiment will be explained in more detail by reference to FIG. 5.

Charging the accumulators 14 and 16 may also be undertaken from the outside without having to open the housing 8. This embodiment shall be described in the following by reference to FIGS. 3, 4, 6, and 7.

On an output shaft 24 of the electromotor 12, a cam 26 is positioned. The free lower end of the output shaft 24 in FIG. 1 is held in a suitably formed support bearing 28. Upon a rotation of the electromotor 12 and thus of the output shaft 24, the cam 26 arranged thereon in a rotationally fixed manner generates vibrating movements which are imparted to the surrounding water by the housing 8. The vibration waves propagate in the water in all directions and effect corresponding vibrating motions of the fibers of the textile materials or of the dirt particles clinging to them, or dirt adhering to the dishes or the like. The motor speed is in a range of approximately 1,800 to 9,000 revolutions per minute, more precisely of approximately 2,400 to 6,000, in particular in a range of approximately 3,000 revolutions per minute. By means of the speeds indicated above, vibration frequencies of the cam 26 of approximately 30 to 150 Hz can be achieved. Under practical conditions, frequencies of less than 30 Hz and in excess of 150 Hz produced no cleaning effects at all or only very inferior ones, whereas vibration frequencies of approximately 40 to 100 Hz and in particular of approximately 50 Hz achieved the best results.

The oscillation or vibrating motion of the housing 6 moreover results in enriching the water with oxygen due to an agitation of the water surface and thus in a further improved cleaning effect.

In the embodiment according to FIG. 1 as well as in the embodiment of FIG. 2 to be described in the following, a receiving chamber 30 may be formed in the housing 8 for a cleaning agent which then, via a corresponding bore 32 in the wall of the housing 8, by and by leaves the receiving chamber 30 and passes into the water. Examples for such auxiliary agents are a common usual detergent, a stain remover, a rinsing agent or a brightener, a fragrant substance, granules releasing oxygen, or the like. One reason for the use of such agents is that without their use, particularly in the case of textile materials, the typical fragrance of freshly cleaned laundry which is felt by many people to be very agreeable will be lacking after the cleaning process.

Besides the vibrations of the housing 8 produced by the motor 12 or the cam 26, respectively, the washing or cleaning performance of the device 2 according to the invention is improved or even intensified due to the fact that the motor 12 in operation generates a magnetic field. It is known that magnets exert a positive effect on water as they are able to influence on calcium contained in the water, such that the water becomes "softer", with the possibility of particularly good washing or cleaning effects resulting in combination with the vibrations or oscillations of the housing 8.

Figure 2:
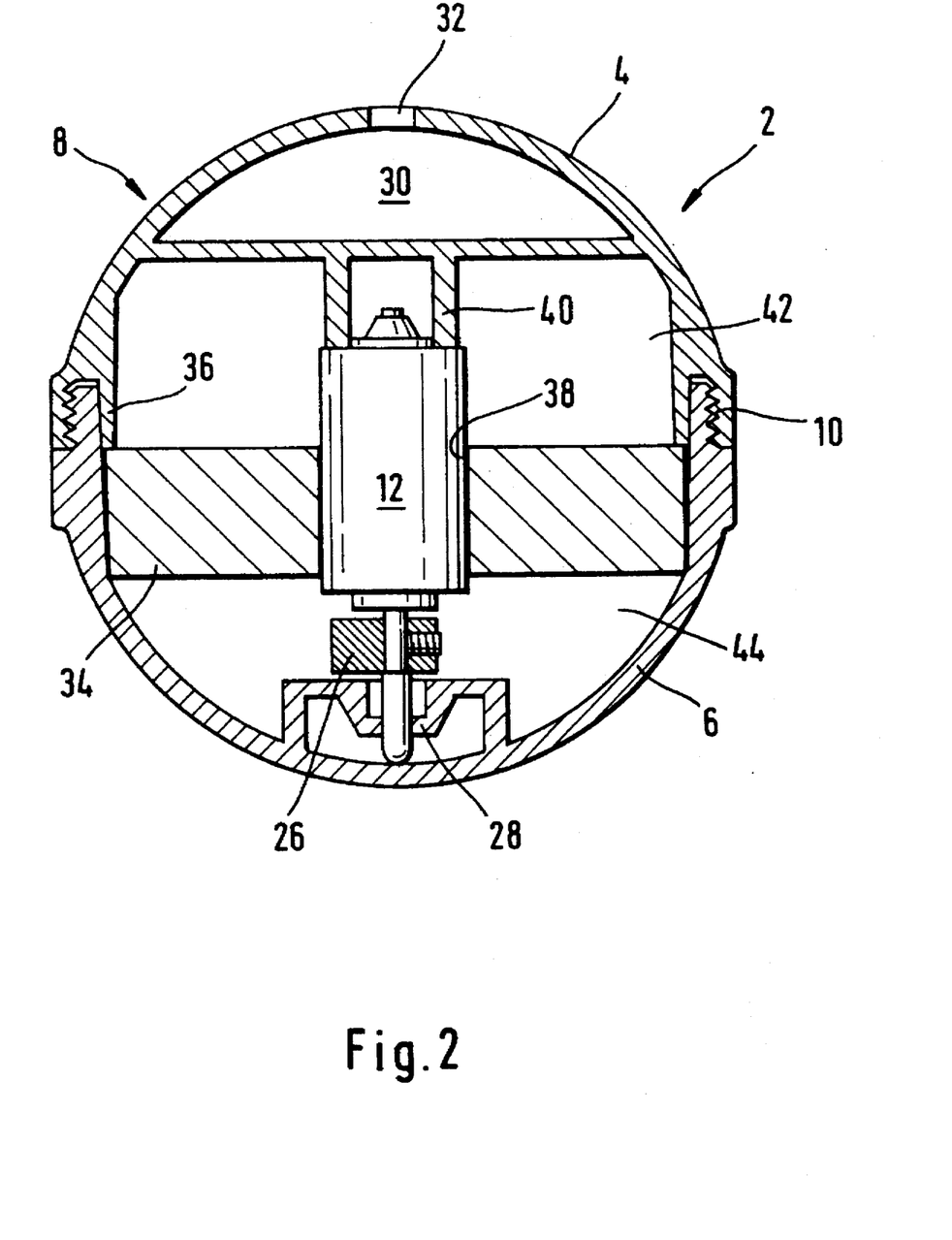
FIG. 2 shows a sectional view of a further embodiment of the device according to the invention.

This circumstance is made use of by the embodiment of FIG. 2. FIG. 2 shows a sectional view analogous to the one of FIG. 1 of another embodiment of a device 2 according to the invention. The same reference numerals as in FIG. 1 designate identical components, and their description shall not be repeated.

According to FIG. 2, a magnet 34 independent of the magnet of the motor 12 is arranged in the region of the screw connection 10. The magnet 34 here is a permanent ring magnet, resting with its outer circumference on the inner surface of the lower shell 6 underneath the screw connection 10. The outer circumference of the magnet 34 may be bonded to the inner wall of the lower shell 6 in the region of their mutual contact. Furthermore a flange 36 of the upper shell 4 in the closed condition of the screw connection according to FIG. 2 may press from above on the upper surface of the ring magnet 34 in its marginal region, such that in combination with the curvature of the lower shell 6, the ring magnet 34 is held securely. The ring magnet 34 comprises a central opening 38 supporting the electromotor 12 in cooperation with mounting webs 40, such that the electromotor 12 is held securely between the mounting webs 40, the central opening 38 of the ring magnet 34 and the lower bearing 28. Spaces 42 and 44 remaining above and underneath the ring magnet 34 then serve to receive correspondingly dimensioned energy supply elements, i.e. batteries or accumulators. As the ring magnet 34 is arranged in the region of the screw connection 10 between upper shell 4 and lower shell 6 and thus in an area of the maximum diameter of the housing 8, the ring magnet 34 may be designed to be correspondingly large-sized and thus have a high performance, i.e. emitting a strong magnetic field. If the ring magnet 34 is furthermore arranged somewhat underneath the precise equatorial plane of the housing 8 in accordance with FIG. 2, its weight acts to automatically adjust the position of the housing 8 such as to always be essentially aligned in the washing or cleaning fluid in such a manner that the rotational axis or output shaft 24 of the motor 12 is vertically aligned. Finally the ring magnet 34 may be given such a size that its weight counteracts the buoyance of the housing 8, whereby the latter remains just about submerged in the washing or cleaning fluid.

Figure 3:
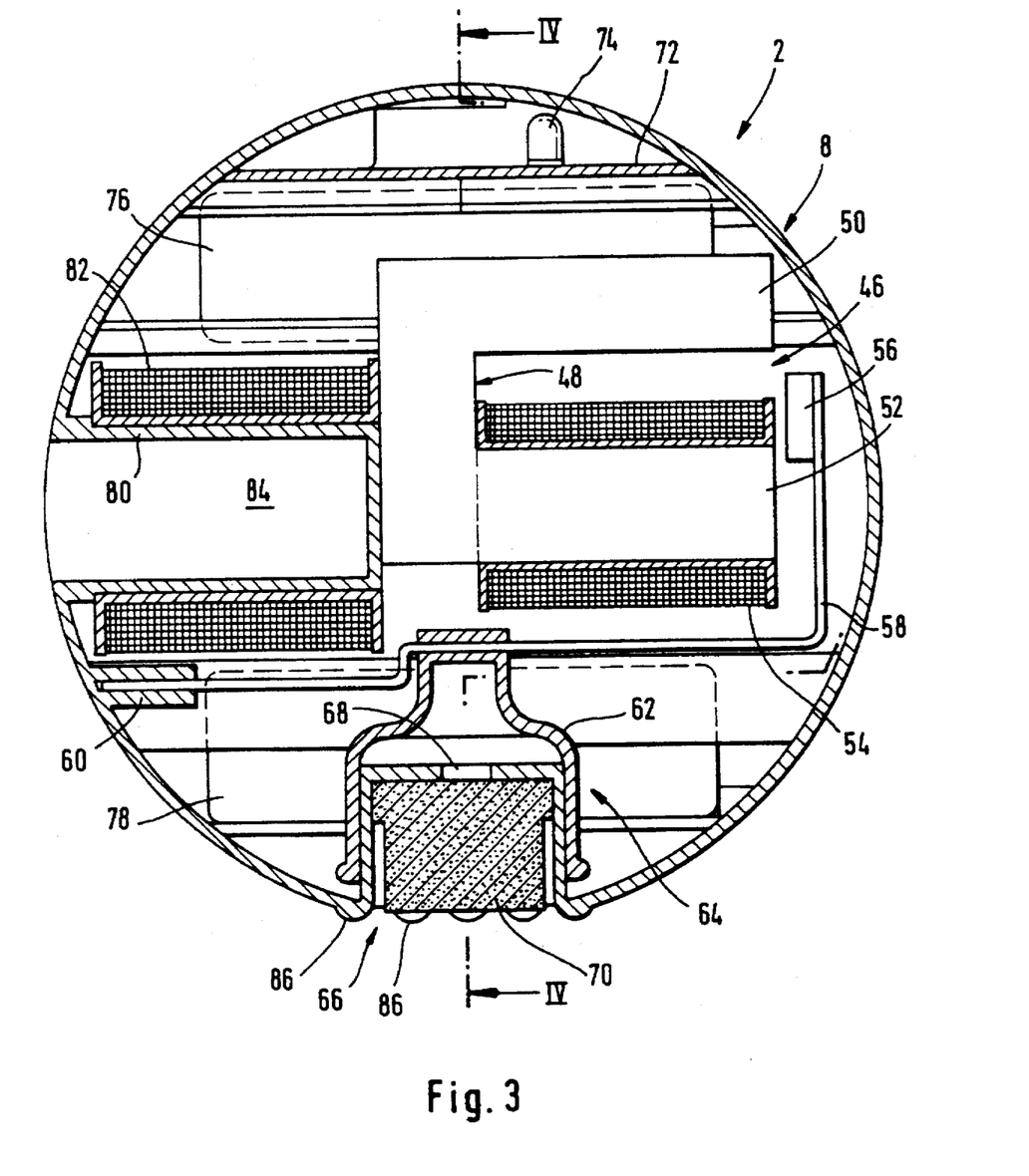
FIG. 3 shows a longitudingal sectional view along the line III—III of FIG. 4 of another embodiment of a device according to the invention.
Figure 4:
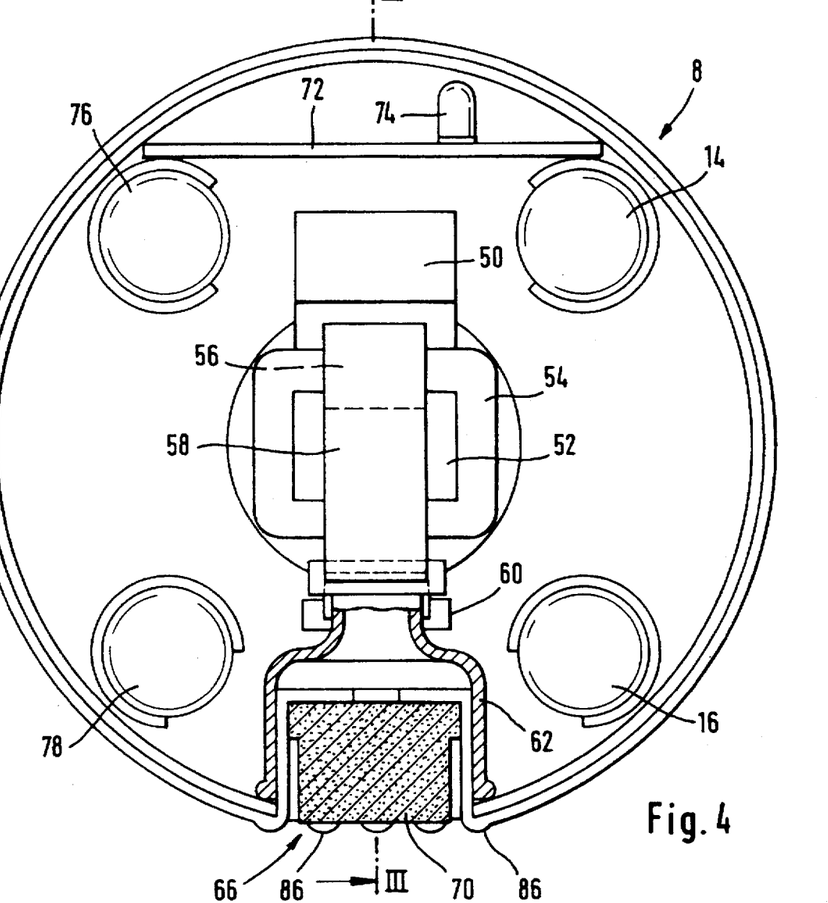
FIG. 4 shows a cross-sectional view along the line IV—IV of FIG. 3.

In FIGS. 3 and 4 another possible embodiment of the present invention is illustrated. FIG. 3 shows a central vertical section along line III—III in FIG. 4, and FIG. 4 shows a central horizontal section along line IV—IV in FIG. 3. Identical or analogous components in FIGS. 1 and 2 are designated with identical reference numerals in FIG. 3 and 4, and their description shall not be repeated.

In the embodiment according to FIGS. 3 and 4, the device 2 again comprises the spherical housing 8, however with the circumference of the housing 8 essentially being closed as opposed to the embodiment according to FIG. 1, i.e. not being constituted by upper and lower dome-shaped shells. Inside housing 8 there is an oscillating armature motor 46 essentially constituted by a core 48 in the shape of a horse-shoe and having two legs 50 and 52, with trip coil 54 being wound around the leg 52. A permanent magnet 56 is arranged in a lateral position relative to the oscillating armature motor 46 and at a distance thereof. The permanent magnet 56 is carried by a spring steel sheet 58 having the angular shape represented in FIG. 6 and comprising a short leg carrying the permanent magnet 56, and a longer leg held in a suitable mount 60 on the material of the housing 8. The longer leg is also connected to a pump bellows 62 of a diaphragm pump 64. The pump bellows 62 is in a watertight manner pulled over a recess or depression 66 formed in the wall of the housing 8, with the bottom surface of the depression 66 presenting a bore 68.

A porous element 70, for example some kind of volcanic rock or a so-called discharger rock as used in tanks for keeping fish, is held in the depression 66.

Figure 6:
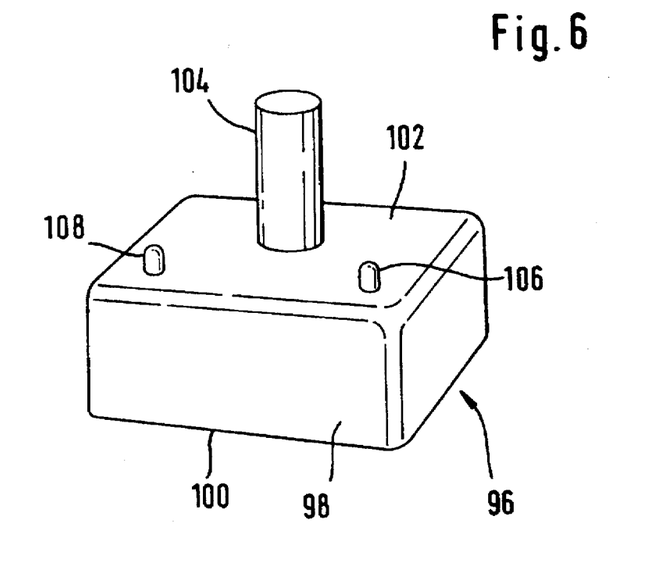
FIG. 6 shows a perspective representation of a charging device for use with one of the embodiments of FIGS. 1 to 4.
Figure 7:
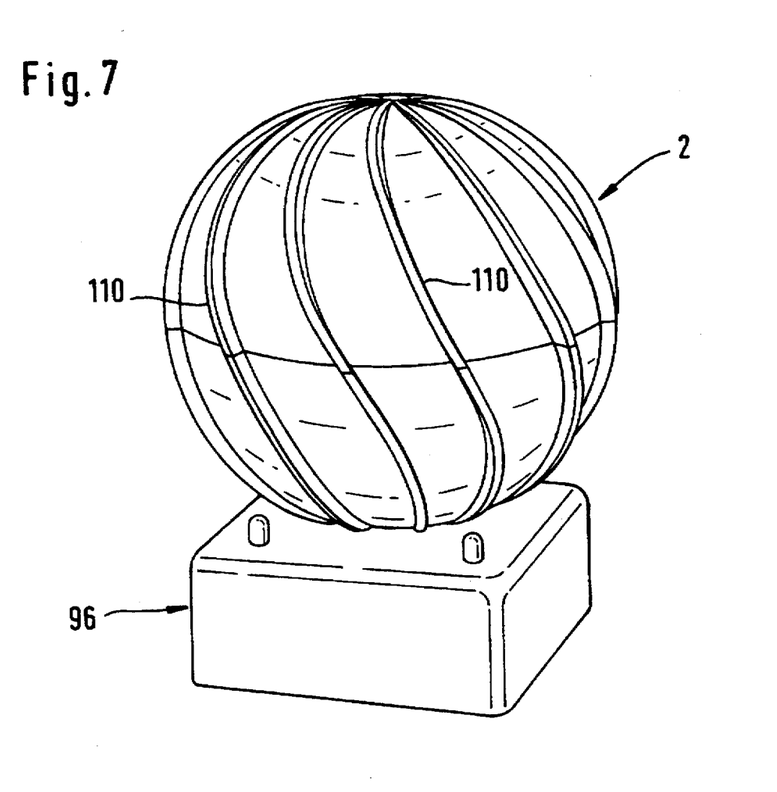
FIG. 7 shows a perspective representation of a combination of the charging device of FIG. 6 with one of the embodiments of FIGS. 1 to 4.

Diametrically opposite from the depression 66 there are arranged inside the housing 8 on a circuit board 72 electronic control, regulation and charging means not represented in the drawing. The pole cap adjacent the circuit board 72 of the housing 8 may be formed to be transparent. For example during manufacture of the housing 8, a transparent shell is injection molded onto the remaining opaque material of the housing 8. In this case, an LED 74 or some other light-emitting element suited for indicating standby and/or charge conditions of the accumulators 14 and 16 may be provided on the circuit board 72. As can be seen in FIGS. 6 and 7, two more accumulators 76 and 78 are provided in this embodiment in addition to the accumulators 14 and 16. The operating duration of the device according to the embodiments in FIGS. 6 and 7 is hereby practically rendered double in comparison with the embodiment of FIG. 1.

Diametrically opposite from the oscillating armature motor 46, an induction coil 82 is located in the inner space of the housing 8 on a corresponding support projection 80 protruding into the inside of the housing 8 as a closed cylinder. The enclosed cylindrical space defined by the support projection 80 has the function of a receiving chamber 84 for a charging device according to the invention which shall be described in detail later on.

Around the depression 66 containing the porous element 70, a ring of hemispherical protrusions 86 is formed.

Operation and functioning of the embodiment according to FIGS. 3 and 4 shall be explained in the following by reference to the drawing.

When the energy supply from the accumulators 14, 16, 76 and 78 to the oscillating armature motor 46 is activated by a switch—to be explained later on—, the polarity of the two legs 50 and 52 is cyclically reversed by the electronic control means arranged on the circuit board 72 above the trip coil 54, such that the permanent magnet 56 arranged on the spring steel sheet 58 is also cyclically moved up and down in FIG. 3 as it is alternatingly attracted and repelled by the legs 50 and 52. This oscillating movement of the permanent magnet 56 in FIG. 3 imparts itself to the long leg of the spring steel sheet 58 which is guided in the mount 60, such that the pump bellows 62 of the diaphragm pump 64 in FIG. 3 also executes strokes or pumping movements directed upwards and downwards. Via the bore 68 these movements of the pump bellows 62 having an effect in the sense of a volume increase and decrease act on the depression 66. Due to the porous element 70, air in the form of very finely distributed bubbles emanates from the depression 66 into the surrounding water due to these pumping movements, whereby the cleaning effect of the device 2 is considerably improved in cooperation with the oscillations or vibrations produced by the oscillating armature motor 46.

As the housing 8, due to the weight of the porous element 70, tends to align itself automatically in the washing fluid such as to assume the position according to FIG. 3 where the porous element 70 is in the lowest position, the ring of hemispherical projections 86 is arranged such as to surround the depression 66; due to these projections 86, the free surface of the porous element 70 discharging the air bubbles does not directly get into contact with any objects to be cleaned underneath it or with the bottom surface of a washing container, such that air bubbles are not prevented from emanating from the porous element 70. In addition to the emanation of air bubbles from the porous element 70, the pumping movement of the pump bellows 62 generates a certain liquid flow out of the porous element 70. Air emanating from the porous element 70 together with the liquid flow from the depression 66 or from the porous element 70, respectively, in combination with the oscillations of the entire housing 8 generated by the oscillating armature motor 46 produce in the washing fluid the desired washing or cleaning effect.

Coupling the oscillations or vibrations produced by the housing 8 may furthermore be intensified in that at least the lower hemisphere of the housing, i.e. where the porous element is positioned, is provided with a plurality of ribs or webs. This causes the transmission of oscillations from the housing to the surrounding washing fluid to be intensified. This embodiment of the ribs or webs shall be explained in more detail by referring to FIG. 7.

The washing effect is furthermore intensified by the magnetic field generated by the trip coil 54 and the permanent magnet 56 and radiated by the housing 8. This magnetic field may be furthermore be intensified, if necessary, by arranging one or several powerful permanent magnets in suitable locations inside the housing 8.

Use of the oscillating armature motor 46 instead of the electromotor 12 provides the essential advantage that oscillating armature motors, compared with electromotors consisting of rotor and stator, are not sensitive to the influence of heat, consequently they may be used in fields where temperatures of 60° C. and more are to be expected, for example in laundering or cleaning strongly dirty objects.

Figure 5:
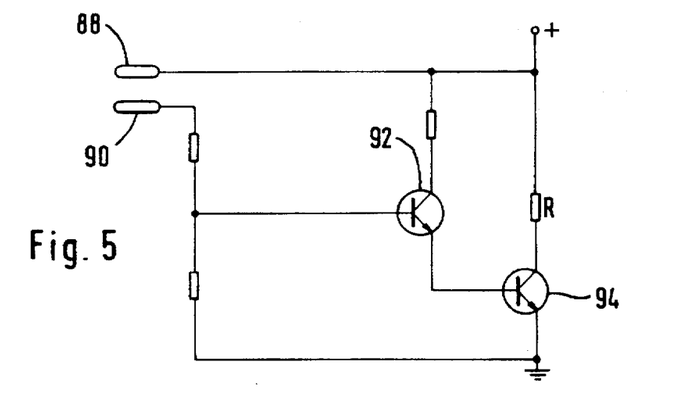
FIG. 5 shows the circuit configuration of an advantageous embodiment for use in one of the embodiments of FIGS. 1 to 4.

As already mentioned above, it is an advantageous embodiment of the present invention to furnish a possibility whereby the energy supply for either the electromotor 12 in the embodiments according to FIG. 1 or 2 or for the oscillating armature motor 46 in the embodiment according to FIGS. 3 and 4 automatically switches on when the device 2 or the housing 8, respectively, gets into contact with the washing or cleaning fluid. FIG. 5 illustrates such a possibility.

On the outer wall of the housing 8 two contact electrodes 88 and 90 are arranged in close vicinity, however electrically insulated from each other in air. The contact electrodes 88 and 90 are in series connection with an amplifying circuit constructed of two transistors 92 and 94 in Darlington configuration. The collector-emitter path of the transistor 94 is connected between a positive power supply and ground, with the resistor shown under R being assumed to be the load resistor formed by the electromotor 12 or the oscillating armature motor 46, respectively. If the housing 8 of the device 2 is immersed in water or generally in a cleaning fluid, the potential between the two contact electrodes 88 and 90 becomes identical in such a manner that the positive voltage applied to the contact electrode 88 is also applied to the contact electrode 90, whereby the transistor 92 and also the transistor 94 are rendered conductive and flow of the load current is enabled. As soon as the device 2 or its housing 8, respectively, is removed from the water such that there is no more wetness present between the contact electrodes 88 and 90, the contact electrode 90 is separated from the positive potential of contact electrode 88, the transistors 92 and 94 are disabled, and the load current via the transistor 94 is interrupted. Hereby a possibility of the device 2 automatically switching on whenever it gets into contact with the washing or cleaning fluid has been furnished in an advantageous manner. It is therefore not necessary to provide a switch to be formed watertight on the outside of the housing 8 or to subdivide the housing 8 into two separable shells in order to be able to manipulate a switch positioned inside the inner space of the housing 8 when necessary.

For re-charging the accumulators 14, 16, 76, and 78 the receiving chamber 84 is used together with the induction coil 82. FIGS. 6 and 7 show a possible embodiment of such a charging device and a combination of charging device and washing or cleaning device.

In the exemplary case of FIGS. 6 and 7, the charging device 96 consists of a rectangularly shaped housing having a base surface 100, with a column-shaped extension 104 formed on the surface 102 facing away from the base surface 100. In the embodiment of the charging device 96 represented in FIG. 6, the extension 104 has the shape of a circular cylinder, with the outer diameter of the extension 104 being matched to the inner diameter of the receiving chamber 84 of the housing 8 such that the extension 104 may be introduced essentially without a clearance into the receiving chamber 84. The length of the extension 104 is furthermore designed to essentially conform with the depth of the receiving chamber 84.

Inside the extension 104, there is an induction coil serving as an inductive transmitter. When the housing 8 and its receiving chamber 84 are placed on the charging device 96 such that the extension 104 is lodged in the receiving chamber 84, the inductive transmitter coil inside the extension 104 and the coil 82 acting as a receiver coil are immediately adjacent the outer region of the receiving chamber 84.

Inside the charging device 96 or the housing 98, respectively, there are corresponding electronic means capable of sensing the charge condition of the accumulators 14, 16, 76 and 78 and, upon sensing that these accumulators require to be re-charged, activate the induction coil inside the extension 104. This may in a given case be indicated by a LED 106 formed on the surface 102. The LED 106 is for example of a red color, indicating to the user that a charging process is going on. During the charging process, power radiated by the transmitter coil in the extension 104 is received by the receiver coil 82, such that this coil 82 supplies a corresponding charging voltage or a charging current which is suitably processed and regulated by the electronic means on the circuit board 72 and then supplied to the accumulators 14, 16, 76, and 78. The charge condition of the accumulators may, in a given case, be checked or verified by means of the LED 74 or some other optical indicator means. As soon as the charging process has been terminated, another LED 108 on the surface 102, for example having a green color, may be activated with the red LED 106 extinguishing simultaneously, giving a clear optical signal to a user that the charging process has been terminated and that the device 2 according to the invention is operable.

Use of the charging device 96 according to the invention with inductive charging inside the housing 8 offers the considerable advantage that—other than in the embodiment e.g. of FIGS. 1 and 2—the housing may be of the completely encapsulating type, which means that it does no more have to consist of two shells which must be combined with each other. Problems with tightness may thus reliably be avoided. In combination with the automatic power switching device according to FIG. 5, handling and use are furthermore extremely simple, and erroneous operation practically cannot occur any more.

FIG. 7 shows a combination of the charging device 96 and of the device 2 according to the invention. FIG. 7 furthermore shows the embodiment of rib-like or web-like projections 110 formed on the outer surface of the housing 8. The projections 110 are in the represented embodiment curved in an S-shape and equidistant, i.e. at an equal pitch from each other, from the lower pole to the upper pole of the housing 8. Besides an interesting and optically attractive exterior of the housing 8, the projections 110 effect an increase of the surface of the housing 8, such that coupling the oscillations or vibrations of the housing 8 to the surrounding washing or cleaning fluid will be intensified. In addition, due to the sphere shape of the housing 8, there ensues a homogeneous radiation of the vibrations or oscillations along all three spatial axes without any disturbing interferences or cancellations, such that the housing 8 may consequently be seen to constitute a spherical or omnidirectional radiator. An equally incense and homogeneous transmission of vibrations is ensured hereby.

Besides the electronic charging and regulating means necessary for the charging process, further electronic means may be present on the circuit board 72, for example a chip whereby a particular washing program may be triggered. The chip may, for example, have the form of a so-called ROM (read only memory), and information contained in the ROM are able e.g. to temporarily vary the speed of the motor 12 or the oscillating frequency of the oscillating armature motor 46, respectively, and/or to interrupt the supply of energy to the motors 12 or 46, respectively, following a certain duration of time in order to avoid total discharge of the accumulators. For this latter case, an additional electronical total discharge protection may also be provided.

It is understood that the embodiments described above and represented in the drawing should be understood to be illustrative examples. Modifications thereof and combinations of the represented embodiments among each other are naturally possible without leaving the scope of the present invention. For instance, the chambers 30 in FIGS. 1 and 2 may be left away if additional introduction of detergents or cleaning agents is not desired or required. For example, additional introduction of oxygen into the water may be effected by means of usual oxygen tablets or granules containing oxygen and introduced into the washing or cleaning fluid containing the objects to be cleaned together with the device 2. The feature of inductive charging may, of course, also be applied to the embodiments of FIGS. 1 and 2, and in the embodiments of FIGS. 3 and 4 an additional, strong magnet may be arranged in a suitable location inside the housing 8 even though the magnet of the oscillating armature motor 46 already generates a comparatively strong magnetic field. The shape or course of the rib-like projections 110 is not limited to the S-shaped curvature represented in FIG. 7 the projections 110 may, or example, follow entirely straight lines between the lower and upper poles of the spherical housing 8.

We claim:

1. Device for cleaning dirty objects, which comprises a fluid-tight housing which is capable of being totally immersed in water together with the dirty objects and generating vibrations by means of a drive mechanism located inside the housing, wherein the vibrations are generated by means of an unbalanced weight and propagate in all directions at a vibrating frequency of approximately 30 to 150 Hz.

2. Device according to claim 1, wherein the housing consists of two halves connected to each other such as to be watertight.

3. Device according to claim 1, wherein the vibrations are generated by means of an unbalanced weight driven by an electromotor.

4. Device according to claim 3, wherein the electromotor operates at a speed of approximately 1,800 to 9,000, corresponding to a vibrating frequency of the unbalanced weight of approximately 30 to 150 Hz.

5. Device according to claim 3, wherein at least one additional magnet is arranged inside the housing.

6. Device according to claim 5, wherein said one additional magnet is a permanent ring magnet.

7. Device according to claim 6, wherein said ring magnet is arranged in the region of the equatorial plane of said spherical housing.

8. Device according to claim 3, wherein the electromotor operates at a speed of approximately 2,400 to 6,000 revolutions per minute corresponding to a vibrating frequency of the unbalanced weight of approximately 40 to 100 Hz.

9. Device according to claim 3, wherein the electromotor operates at a speed of approximately 3000 revolutions per minute corresponding to a vibrating frequency of the unbalanced weight of approximately 50 Hz.

10. Device according to claim 3, wherein the upper end region of the electromotor is held in the central opening of the permanent ring magnet.

11. Device according to claim 1, wherein the shape of the housing is essentially spherical.

12. Device according to claim 11, wherein the spherical surface is provided with a plurality of rib-like projections.

13. Device according to claim 12, wherein the rib-like projections follow a generally S-shaped curvature and are equidistant from the lower pole to the upper pole of the spherical housing.

14. Device according to claim 1, wherein in addition to generating vibrations, the drive mechanism drives a pump element.

15. Device according to claim 14, wherein said drive mechanism is an oscillating armature motor arranged inside the watertight closed housing together with the associated energy supply and control means.

16. Device according to claim 15, wherein said oscillating armature motor drives a diaphragm pump.

17. Device according to claim 16, wherein said diaphragm pump comprises a porous element of the type of a discharger rock in its outlet opening.

18. Device according to claim 1, wherein the energy supply of the electromotors and/or of the oscillating armature motor and/or of other energy consumers is effected by means of a plurality of accumulators arranged inside the housing.

19. Device according to claim 18, wherein said accumulators are re-chargeable free of contact via an induction coil.

20. Device according to claim 19, wherein said induction coil is positioned around a receiving chamber which extends inside said housing.

21. Charging device for a device for cleaning dirty objects according to claim 20, further comprising a second housing provided with a base surface, with a column-shaped extension being formed on a surface of the second housing facing away from said base surface, the outer section of which matches with the inner section of said receiving chamber of the housing of the device essentially without a gap, and an inductive transmitter coil being arranged inside said extension.

22. Device according to claim 1, wherein said drive mechanism is activated free of contact upon immersion of said housing into the water.

23. Device according to claim 1, wherein in said housing a chamber is formed for a cleaning agent which is a detergent, a stain remover, a rinsing agent, a fragrant substance, or an oxygen carrier.

24. Device according to claim 1, wherein said housing contains a memory chip having a read only memory for a washing program.

25. Device for cleaning dirty objects which comprises a fluid-tight housing which is capable of being totally immersed in water together with the dirty objects and being made to vibrate by means of a drive mechanism located inside the housing, wherein the vibrations are generated by means of an unbalanced weight and propagate in all directions at a vibrating frequency of approximately 30 to 150 Hz, further including a charging device for cleaning dirty objects according to claim 21.

26. A device for cleaning dirty objects, which comprises a fluid-tight housing for being totally immersed in water together with dirty objects, said housing containing an unbalanced weight and an electromotor for driving the unbalanced weight so as to generate vibrations, wherein the vibrations propagate in all directions.

27. The device of claim 26, further comprising:

an induction coil receiving power, to drive said electromotor, from an external source.

28. The device of claim 27, wherein the external power source is an inductive transmitter.

29. The device of claim 28, wherein the inductive transmitter is an induction coil, provided as part of a charging device.

30. The device of claim 29, wherein the inductive coil of the charging device is housed in an extension of the charging device, which is matched in dimensions with a receiving chamber of said fluid-tight housing.

31. The device of claim 30, wherein said device is charged by inductive coupling between said induction coil and the induction coil of the charging device.

32. The device of claim 26, wherein said device is charged by inductive coupling.

33. The device of claim 32, wherein the inductive coupling occurs between an induction coil within said fluid-tight housing and an induction coil of a charging device, wherein the induction coil of the charging device acts as an induction transmitter.

34. A device for cleaning dirty objects, which comprises a fluid-tight housing for being totally immersed in water together with dirty objects, said housing having a spherical surface provided with a plurality of rib-like projections having a generally S-shaped curvature, and said housing containing an unbalanced weight and an electromotor for driving the unbalanced weight so as to generate vibrations, wherein the vibrations propagate in all directions.

35. A device for cleaning dirty objects, which comprises a fluid-tight housing for being totally immersed in water together with dirty objects, said housing containing an unbalanced weight and an electromotor for driving the unbalanced weight so as to generate vibrations, wherein the vibrations propagate in all directions, said electromotor having an energy supply means which supplies energy to the electromotor upon immersion of said housing into water without requiring that the housing be contacted.

* * * * *